(12) United States Patent
Yamada

(10) Patent No.: US 8,797,646 B2
(45) Date of Patent: Aug. 5, 2014

(54) RELAY ZOOM SYSTEM

(75) Inventor: Kenji Yamada, Yachiyo (JP)

(73) Assignee: Nikon Vision Co., Ltd., Tokyo (JP)

( * ) Notice: Subject to any disclaimer, the term of this patent is extended or adjusted under 35 U.S.C. 154(b) by 815 days.

(21) Appl. No.: 12/992,981

(22) PCT Filed: Jun. 18, 2009

(86) PCT No.: PCT/JP2009/061079
§ 371 (c)(1),
(2), (4) Date: Dec. 17, 2010

(87) PCT Pub. No.: WO2009/157360
PCT Pub. Date: Dec. 30, 2009

(65) Prior Publication Data
US 2011/0109963 A1 May 12, 2011

(30) Foreign Application Priority Data
Jun. 25, 2008 (JP) ................................ 2008-165599

(51) Int. Cl.
*G02B 15/14* (2006.01)

(52) U.S. Cl.
USPC ............................. 359/432; 359/434; 359/691

(58) Field of Classification Search
USPC .......................... 359/432, 434, 676, 691, 692
See application file for complete search history.

(56) References Cited

U.S. PATENT DOCUMENTS

| | | | | |
|---|---|---|---|---|
| 5,035,492 A * | 7/1991 | Ito | ................................. | 359/676 |
| 5,204,779 A * | 4/1993 | Nakata et al. | ................. | 359/688 |
| 5,959,772 A * | 9/1999 | Yonezawa | ..................... | 359/434 |
| 6,362,923 B1 * | 3/2002 | Lange et al. | .................. | 359/689 |
| 6,493,138 B2 | 12/2002 | Nishida | | |
| 7,224,535 B2 * | 5/2007 | Neil | .............................. | 359/683 |
| 7,768,715 B2 * | 8/2010 | Gohman et al. | .............. | 359/676 |
| 2004/0021953 A1 * | 2/2004 | Betensky et al. | ............. | 359/691 |
| 2006/0227415 A1 * | 10/2006 | Caldwell et al. | .............. | 359/432 |

FOREIGN PATENT DOCUMENTS

| | | |
|---|---|---|
| JP | A-58-184917 | 10/1983 |
| JP | B2-61-61364 | 12/1986 |
| JP | A-5-11184 | 1/1993 |
| JP | A-5-273465 | 10/1993 |
| JP | A-9-274137 | 10/1997 |
| JP | A-2000-275516 | 10/2000 |
| JP | A-2001-255464 | 9/2001 |
| JP | A-2002-267936 | 9/2002 |
| JP | A-2004-246139 | 9/2004 |

OTHER PUBLICATIONS

Machine translation of JP 2000-275516 from http://www4.ipdl.inpit.go.jp/Tokujitu/tjsogodbenk.ipdl downloaded on Sep. 18, 2013.*

(Continued)

*Primary Examiner* — Frank Font
(74) *Attorney, Agent, or Firm* — Oliff PLC

(57) ABSTRACT

A relay zoom system includes, in order from an object side, a first lens group having a positive refractive power and a second lens group having a positive refractive power. Furthermore, in the relay zoom system, the first lens group and the second lens group are each made up of at least two positive lenses and one negative lens. The first lens group and the second lens group in the relay zoom system are configured so as to move along an optical axis when magnification is varied from a lower magnification edge state to a higher magnification edge state.

11 Claims, 10 Drawing Sheets

(56) References Cited

OTHER PUBLICATIONS

Japanese Office Action issued in Japanese Patent Application No. 2010-517956 on Jun. 5, 2013 (with translation).

International Search Report for International Patent Application No. PCT/JP2099/061079, mailed on Jul. 14, 2009 (w/ English translation).

* cited by examiner

RELAY ZOOM SYSTEM

TECHNICAL FIELD

The present invention relates to a relay zoom system.

BACKGROUND ART

Conventionally, an optical system like that described in Patent Literature 1 is used as an imaging optical system for performing photography of an object image using an objective lens such as a telescope or a microscope.

CITATION LIST

Patent Literature

Patent Literature 1: Japanese Patent Publication No. 61-061364

SUMMARY OF INVENTION

Technical Problem

However, since a conventional imaging optical system has a fixed magnification, varying the magnification problematically necessitates re-mounting of an imaging optical system with a different magnification.

The present invention has been made in consideration of the problem described above, and an object thereof is to provide a relay zoom system capable of realizing an imaging optical system with different magnifications using the same imaging optical system.

Solution to Problem

In order to solve the problem described above, a relay zoom system according to the present invention includes, in order from an object side, a first lens group having a positive refractive power and a second lens group having a positive refractive power, wherein the first lens group and the second lens group are each made up of at least two positive lenses and one negative lens, and the first lens group and the second lens group are configured so as to move along an optical axis when magnification is varied from a lower magnification edge state to a higher magnification edge state.

With such a relay zoom system, if f1 denotes a focal length of the first lens group and f2 denotes a focal length of the second lens group, then the relay zoom system preferably satisfies a condition expressed by the following expression:

$$1 < f1/f2 < 1.5.$$

In addition, in such a relay zoom system, the first lens group is preferably made up of a cemented lens which cements together a positive lens and a negative lens, and a single positive lens, wherein if f11 denotes a focal length of the cemented lens and f12 denotes a focal length of the single positive lens, then the relay zoom system preferably satisfies a condition expressed by the following expression:

$$1 < f11/f12 < 2.$$

Furthermore, in such a relay zoom system, the lenses of the second lens group are preferably arranged in an order of positive, negative, and positive.

Moreover, in such a relay zoom system, the second lens group preferably further includes at least one negative lens, wherein the negative lens is preferably cemented together with at least one of the two positive lenses included in the second lens group.

In addition, in such a relay zoom system, when magnification is varied from a lower magnification edge state to a higher magnification edge state, the first lens group is preferably configured so as to move towards either an object side or an image side from the lower magnification edge state to a predetermined focal length state and move in the opposite direction from the predetermined focal length state to the higher magnification edge state.

Furthermore, such a relay zoom system preferably has a magnification ratio of 2 or higher.

Moreover, such a relay zoom system preferably relays a primary image by an objective lens to form a secondary image.

Advantageous Effects of Invention

By configuring a relay zoom system according to the present invention as described above, photography of an object at different magnifications can now be performed without having to change the relay optical system.

BRIEF DESCRIPTION OF DRAWINGS

FIG. 1 is a lens configuration diagram of a telescope optical system including a relay optical system according to a first example, wherein (a) illustrates a lower magnification edge state, (b) illustrates an intermediate focal length state, and (c) illustrates a higher magnification edge state.

FIG. 2 presents various aberration diagrams according to the aforementioned first example, wherein (a) illustrates the lower magnification edge state, (b) illustrates the intermediate focal length state, and (c) illustrates the higher magnification edge state.

FIG. 3 is a lens configuration diagram of a telescope optical system including a relay optical system according to a second example, wherein (a) illustrates a lower magnification edge state, (b) illustrates an intermediate focal length state, and (c) illustrates a higher magnification edge state.

FIG. 4 presents various aberration diagrams according to the aforementioned second example, wherein (a) illustrates the lower magnification edge state, (b) illustrates the intermediate focal length state, and (c) illustrates the higher magnification edge state.

FIG. 5 is a lens configuration diagram of a telescope optical system including a relay optical system according to a third example, wherein (a) illustrates a lower magnification edge state, (b) illustrates an intermediate focal length state, and (c) illustrates a higher magnification edge state.

FIG. 6 presents various aberration diagrams according to the aforementioned third example, wherein (a) illustrates the lower magnification edge state, (b) illustrates the intermediate focal length state, and (c) illustrates the higher magnification edge state.

FIG. 7 is a lens configuration diagram of a telescope optical system including a relay optical system according to a fourth example, wherein (a) illustrates a lower magnification edge state, (b) illustrates an intermediate focal length state, and (a) illustrates a higher magnification edge state.

FIG. 8 presents various aberration diagrams according to the aforementioned fourth example, wherein (a) illustrates the lower magnification edge state, (b) illustrates the intermediate focal length state, and (c) illustrates the higher magnification edge state.

FIG. 9 is a lens configuration diagram of a telescope optical system including a relay optical system according to a fifth example, wherein (a) illustrates a lower magnification edge state, (b) illustrates an intermediate focal length state, and (c) illustrates a higher magnification edge state.

FIG. 10 presents various aberration diagrams according to the aforementioned fifth example, wherein (a) illustrates the lower magnification edge state, (b) illustrates the intermediate focal length state, and (c) illustrates the higher magnification edge state.

DESCRIPTION OF EMBODIMENTS

Figure 1:
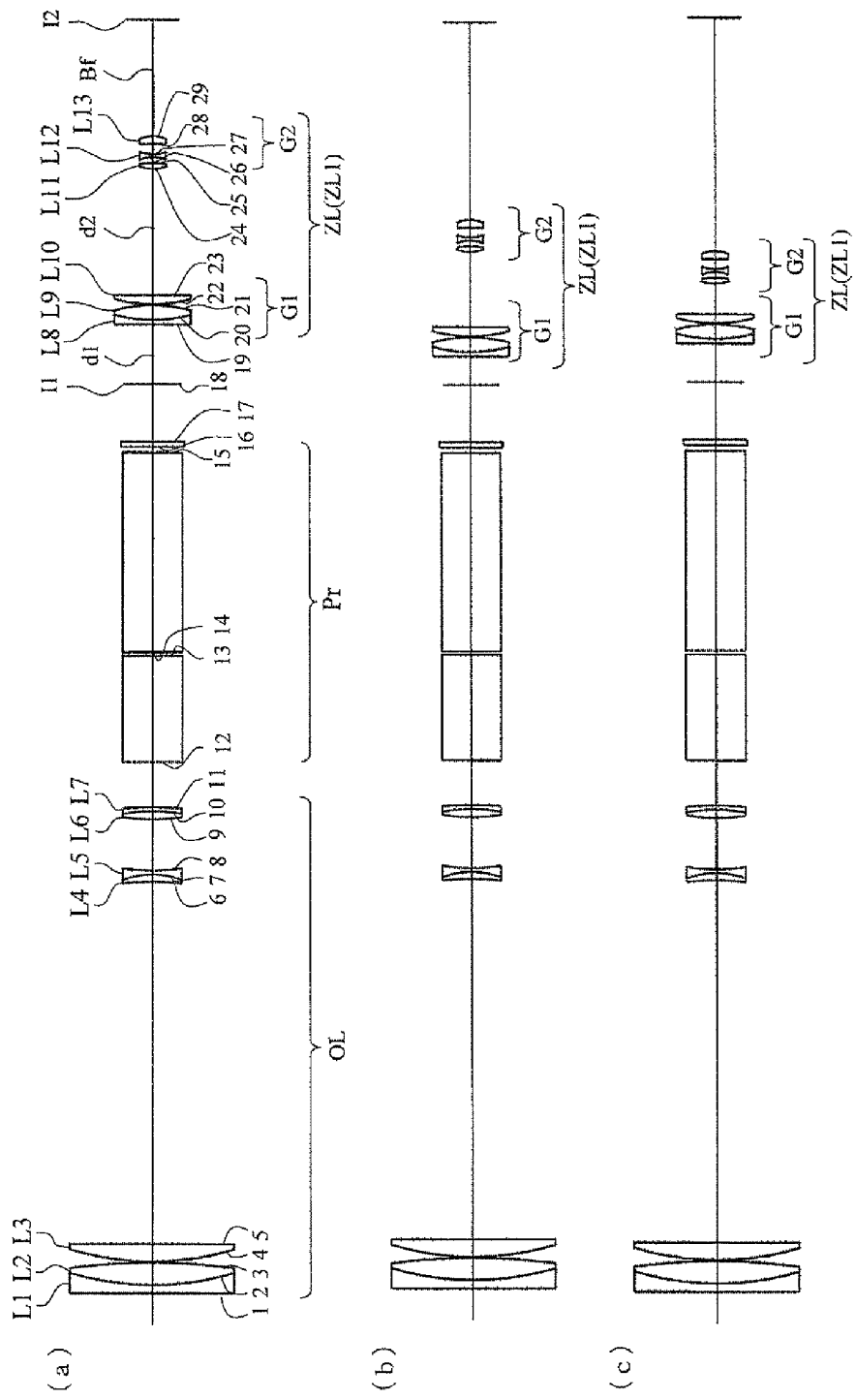
[FIG. 1]

Hereinafter, a preferred embodiment of the present invention will be described with reference to the drawings. First, a case where a relay zoom system according to the present embodiment is used in a telescope optical system will be described with reference to FIG. 1. A telescope optical system illustrated in FIG. 1 is made up of, in order from an object side, an objective lens OL, an erecting prism Pr, and a relay zoom system ZL. The objective lens OL functions to form an image of an object as a primary image I1. The erecting prism Pr functions to convert the image formed by the objective lens OL into an erected image. The relay zoom system ZL relays and varies magnification of the primary image I1 converted into an erected image by the erecting prism Pr, and re-forms the primary image I1 as a secondary image I2. Arranging an imaging plane of an imaging element at a position where the secondary image I2 is to be formed enables an object image to be acquired as a digital image.

The relay zoom system ZL includes, in order from the object side, a first lens group G1 having a positive refractive power and a second lens group G2 having a positive refractive power. The first lens group G1 and the second lens group G2 are configured so as to move along an optical axis when magnification is varied from a lower magnification edge state to a higher magnification edge state.

In the relay zoom system ZL, the first lens group G1 includes at least two positive lenses (a biconvex lens L9 and a planoconvex lens L10 illustrated in FIG. 1) and one negative lens (a planoconcave lens L8 illustrated in FIG. 1) in an order of negative-positive-positive or positive-positive-negative from the object side, and is configured so as to collect light from the primary image I1 formed by the objective lens OL and guide the light to the second lens group G2. The first lens group G1 is configured so as to correct chromatic aberration using the positive lenses and the negative lens. Particularly, as illustrated in FIG. 1, by configuring the first lens group G1 as a cemented lens that cements together the positive lens and the negative lens, manufacturing can be simplified.

Figure 5:
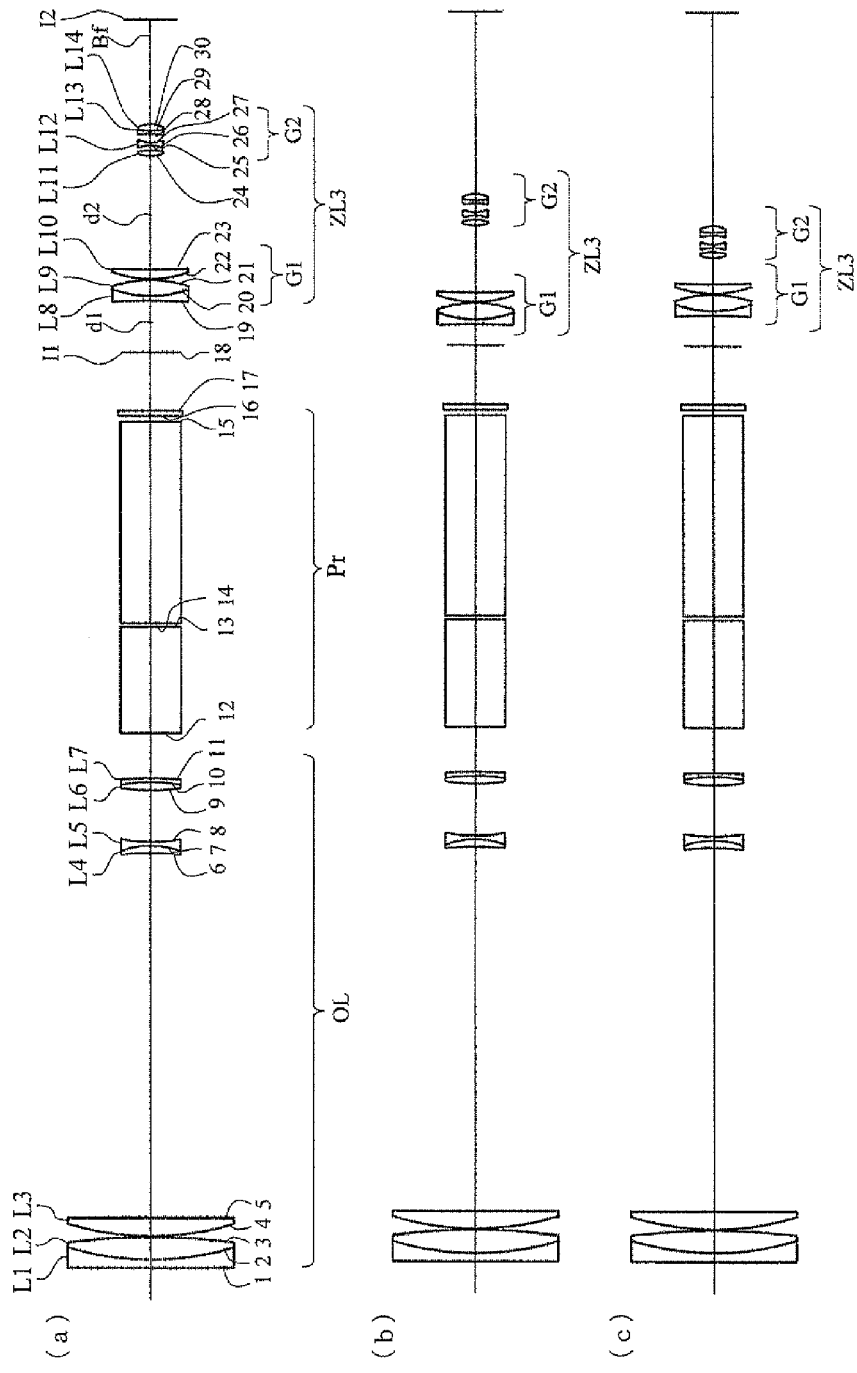
[FIG. 5]

In addition, the second lens group G2 includes at least two positive lenses (a biconvex lens L11 and a positive meniscus lens L13 illustrated in FIG. 1) and one negative lens (a biconcave lens L12) in an order of positive-negative-positive, and is configured so as to collect light guided by the first lens group G1 to form the secondary image I2. The second lens group G2 is configured so as to single-handedly correct chromatic aberration using the positive lenses and the negative lens. Furthermore, the second lens group G2 is configured such that by including a negative lens with a strong refractive power (the biconcave lens L12), the second lens group G2 is able to correct a Petzval sum and ensure field flatness. Moreover, as illustrated in FIG. 5, the second lens group G2 is favorably further provided with another negative lens (a biconcave lens L13 illustrated in FIG. 5) to be cemented with at least one of the two positive lens (a biconvex lens L14 illustrated in FIG. 5) so as to form a cemented lens. Such a configuration increases a degree of freedom of the second lens group G2 and improves an aberration-correcting capability of the entire optical system, thereby realizing high performance.

Furthermore, such a relay zoom system ZL preferably has a magnification ratio of 2 or higher. In particular, when varying magnification from the lower magnification edge state to the higher magnification edge state, by moving the first lens group G1 along an optical axis towards the object side from the lower magnification edge state to a predetermined intermediate focal length state and along the optical axis towards the image side from the predetermined intermediate focal length state to the higher magnification edge state (in other words, by moving the first lens group G1 such that a movement direction thereof is reversed midway during varying of the magnification), a greater magnification ratio can be ensured without having to change the position of the image surface. Moreover, in this case, the second lens group G2 is configured so as to move in the same direction from the lower magnification edge state to the higher magnification edge state.

Configuration conditions of the relay zoom system ZL will now be described. First, with the relay zoom system ZL, if f1 denotes a focal length of the first lens group G1 and f2 denotes a focal length of the second lens group G2, then the relay zoom system ZL preferably satisfies conditional expression (1) below.

$$1 < f1/f2 < 1.5 \quad (1)$$

Conditional expression (1) represents a condition defining an appropriate power distribution between the first lens group G1 and the second lens group G2. When falling below a lower limit of the conditional expression (1), the focal length of the first lens group G1 becomes relatively shorter. In this case, even an attempt using the second lens group G2 to reduce a Petzval sum generated at the first lens group G1 results in an excessive sum and cannot correct field curvature, and is therefore unfavorable. Conversely, when an upper limit of the conditional expression (1) is exceeded, the focal length of the second lens group G2 becomes relatively shorter, resulting in a decrease in respective curvature radius of the lenses that make up the second lens group G2 and an increase in an aberration amount generated at each refractive surface. Therefore, unfavorably, correction of spherical aberration and coma aberration cannot be sufficiently performed.

In addition, with the relay zoom system ZL, if f11 denotes a focal length of a cemented lens made up of a positive lens and a negative lens (a cemented lens made up of the planoconcave lens L8 and the biconvex lens L9 illustrated in FIG. 1) among the lenses that constitute the first lens group G1, and f12 denotes a focal length of the single positive lens (the planoconvex lens L10 illustrated in FIG. 1) among the lenses that constitute the first lens group G1, then the relay zoom system ZL preferably satisfies conditional expression (2) below.

$$1 < f11/f12 < 2 \quad (2)$$

Conditional expression (2) represents a condition defining an appropriate power distribution between the cemented lens and the single positive lens in the first lens group G1. When falling below a lower limit of the conditional expression (2), the refractive power of the cemented lens becomes too great and, unfavorably, chromatic aberration can no longer be corrected. Conversely, when an upper limit of the conditional expression (2) is exceeded, the refractive power of the single positive lens becomes too great and, unfavorably, distortion can no longer be corrected.

It should be noted that while a case where the relay zoom system ZL is used in a telescope optical system is described in the above embodiment and subsequent examples, the relay zoom system ZL is not limited to a telescope optical system and can also be applied to a microscope optical system and the like.

EXAMPLES

Five examples of the aforementioned relay optical system ZL applied to a telescope optical system will be described below. As described above, in the following examples, the telescope optical system is made up of, in order from an object side, an objective lens OL, an erecting prism Pr, and a relay zoom system ZL (ZL1 to ZL5). In this case, the objective lens OL is made up of, in order from the object side, a cemented lens that cements together a planoconcave lens L1 whose planar surface faces the object side and a biconvex lens L2, a planoconvex lens L3 whose convex surface faces the object side, a cemented lens that cements together a positive meniscus lens L4 whose concave surface faces the object side and a biconcave lens L5, and a cemented lens that cements together a biconvex lens L6 and a negative meniscus lens L7 whose concave surface faces the object side. In addition, the erecting prism Pr is made up of three glass blocks.

Table 1 below represents specifications of the objective lens OL and the erecting prism Pr described above. In Table 1, a first field m represents the number of each optical surface from the object side, a second field r represents a curvature radius of each optical surface, a third field d represents a distance on an optical axis from each optical surface to a next optical surface, a fourth field nd represents a refractive index with respect to the d-line, and a fifth field vd represents an Abbe's number. Furthermore, a curvature radius of 0.000 denotes a plane, and the refractive index 1.00000 of air has been omitted. Moreover, the description of the specification table is to also apply to subsequent examples.

While "mm" is generally used as a unit of lengths including curvature radius, surface separation, focal length, and the like described in all specifications presented below unless otherwise specified, since optical systems provide equivalent optical performances even when proportionally magnified or proportionally reduced, the unit of lengths need not be limited to "mm" and other appropriate units can be used.

First Example

FIG. 1 described above illustrates a telescope optical system including a relay zoom system ZL1 according to a first example. The relay zoom system ZL1 according to the present first example includes, in order from the object side, a first lens group G1 having a positive refractive power and a second lens group G2 having a positive refractive power. The first lens group G1 is made up of, in order from the object side, a cemented lens that cements together a planoconcave lens L8 whose planar surface faces the object side and a biconvex lens L9, and a planoconvex lens L10 whose convex surface faces the object side. In addition, the second lens group G2 comprises, in order from the object side, a biconvex lens L11, a biconcave lens L12, and a positive meniscus lens L13 whose concave surface faces the object side.

Specifications of the relay zoom system ZL1 according to the first example and illustrated in FIG. 1 are presented in Table 2. In "General specifications" in Table 2, f denotes focal lengths of the entire system in a lower magnification edge state, an intermediate focal length state, and a higher magnification edge state, while FNo. denotes F numbers corresponding to the focal lengths. In addition, f1 denotes a focal length of the first lens group G1, f11 denotes a focal length of the cemented lens in the first lens group G1, f12 denotes a focal length of the single positive lens in the first lens group G1, and f2 denotes a focal length of the second lens group G2. Furthermore, in "Lens data", surface numbers are presented starting at a primary image surface I1 (eighteenth surface) of the objective lens OL.

In addition, with the relay zoom system ZL1, during varying of the magnification from the lower magnification edge state to the higher magnification edge state, an interval d1 between the primary image surface I1 and the first lens group G1, an interval d2 between the first lens group G1 and the second lens group G2, and an interval (back focus) Bf between the second lens group G2 and a secondary image surface 12 vary. As such, "Variable surface intervals" in Table 2 represent values of variable surface intervals d1, d2, and Bf in the lower magnification edge state, the intermediate focal length state, and the higher magnification edge state. Furthermore, Table 2 also presents values corresponding to the conditional expressions (1) and (2) given above or, in other words, condition-corresponding values. The above descriptions are to also apply to subsequent examples.

TABLE 1

| m | r | d | nd | vd |
|---|---|---|---|---|
| 1 | 0.000 | 4.500 | 1.73350 | 51.1 |
| 2 | 154.115 | 12.000 | 1.49782 | 82.5 |
| 3 | −333.000 | 0.500 | | |
| 4 | 150.348 | 9.500 | 1.49782 | 82.5 |
| 5 | 0.000 | 195.137 | | |
| 6 | −135.380 | 4.000 | 1.72825 | 28.3 |
| 7 | −43.874 | 2.000 | 1.62374 | 47.1 |
| 8 | 90.100 | 27.977 | | |
| 9 | 99.350 | 4.500 | 1.51823 | 58.9 |
| 10 | −82.480 | 2.000 | 1.64769 | 33.9 |
| 11 | −310.750 | 24.621 | | |
| 12 | 0.000 | 57.370 | 1.51680 | 64.1 |
| 13 | 0.000 | 2.000 | | |
| 14 | 0.000 | 107.720 | 1.51680 | 64.1 |
| 15 | 0.000 | 3.000 | | |
| 16 | 0.000 | 3.000 | 1.51680 | 64.1 |
| 17 | 0.000 | 31.400 | | |

TABLE 2

[General specifications]

| | Lower magnification edge | Intermediate focal length | Higher magnification edge |
|---|---|---|---|
| f = | 500 | 1000 | 1500 |
| FNo. = | 5.88 | 11.76 | 17.65 |
| f1 = | | 65.0 | |
| f11 = | | 139.1 | |
| f12 = | | 122.2 | |
| f2 = | | 50.0 | |

[Lens data]

| m | r | d | nd | vd |
|---|---|---|---|---|
| 18 | 0.000 | d1 | | |
| 19 | 0.000 | 2.500 | 1.69895 | 30.0 |
| 20 | 75.816 | 8.000 | 1.62041 | 60.1 |
| 21 | −75.816 | 0.500 | | |
| 22 | 75.816 | 5.000 | 1.62041 | 60.1 |

TABLE 2-continued

| | | | | |
|---|---|---|---|---|
| 23 | 0.000 | d2 | | |
| 24 | 20.550 | 3.200 | 1.62041 | 60.1 |
| 25 | −45.850 | 3.200 | | |
| 26 | −17.400 | 1.600 | 1.62004 | 36.3 |
| 27 | 20.550 | 5.400 | | |
| 28 | −112.200 | 4.300 | 1.62280 | 57.0 |
| 29 | −16.000 | Bf | | |

[Variable surface intervals]

| | Lower magnification edge | Intermediate focal length | Higher magnification edge |
|---|---|---|---|
| f = | 500 | 1000 | 1500 |
| d1 = | 32.186 | 14.905 | 20.799 |
| d2 = | 67.890 | 40.925 | 16.396 |
| Bf = | 62.822 | 107.071 | 125.704 |

[Condition-corresponding values]

(1) f1/f2 = 1.30
(2) f11/f12 = 1.138

Figure 2:
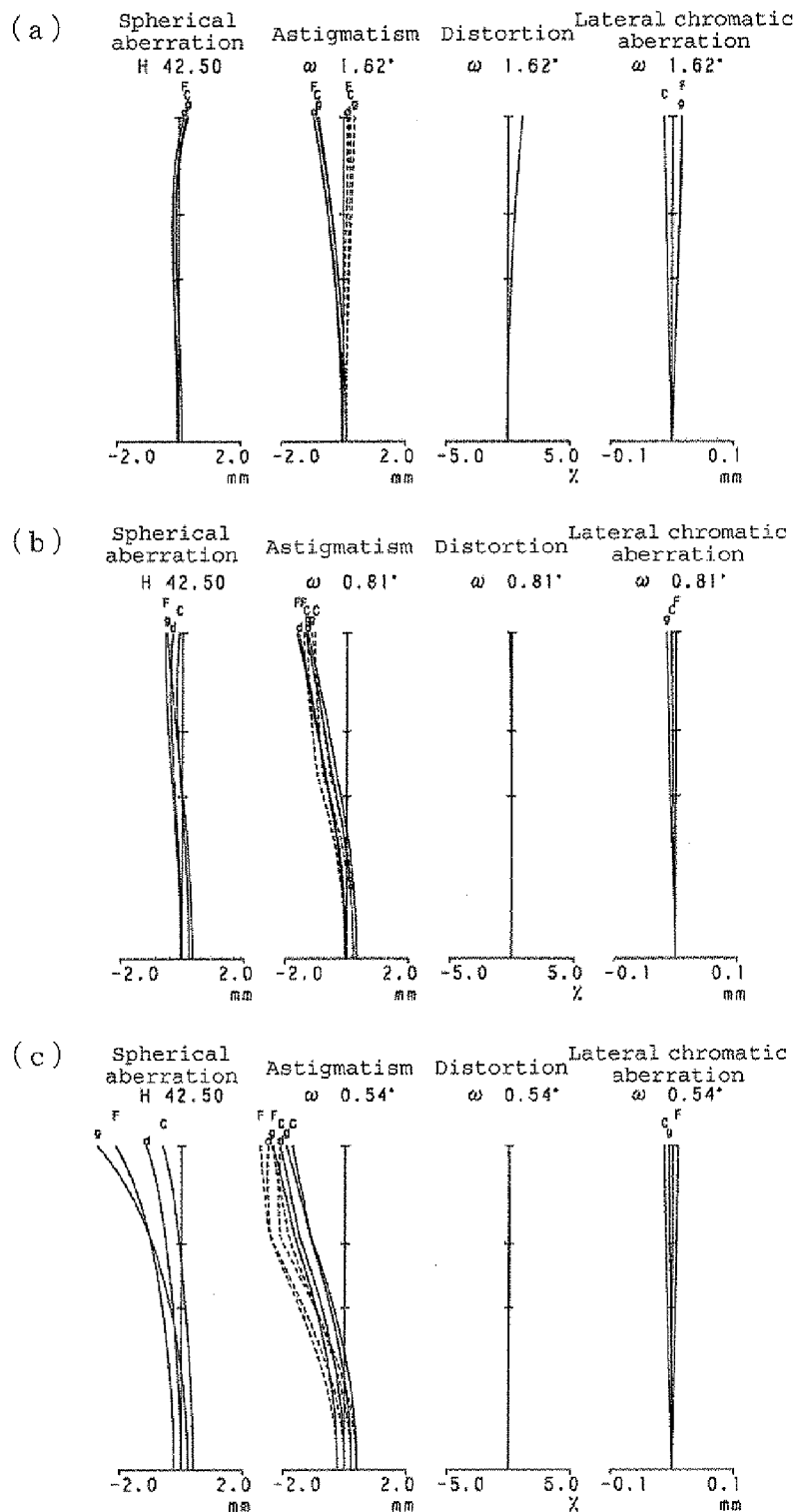
[FIG. 2]

As shown, conditional expressions (1) to (2) given above are both satisfied in the first example. FIG. 2 presents various aberration diagrams of spherical aberration, astigmatism, distortion, and lateral chromatic aberration with respect to rays of the d-line, the C-line, the F-line, and the g-line of the relay zoom system ZL1 according to the present first example in the lower magnification edge state, the intermediate focal length state, and the higher magnification edge state. Among the aberration diagrams, the spherical aberration diagram illustrates an aberration amount with respect to a height H from an optical axis, and the astigmatism diagram, the distortion diagram and the lateral chromatic aberration diagram illustrate aberration amounts with respect to a half angle of view ω. In addition, in the astigmatism diagram, a solid line represents a sagittal image surface corresponding to each wavelength and a dashed line represents a meridional image surface corresponding to each wavelength. The above description of the various aberration diagrams is to also apply to subsequent examples. As is apparent from the various aberration diagrams presented in FIG. 2, with the relay zoom system ZL1 according to the present first example, various aberrations are favorably corrected from the lower magnification edge state to the higher magnification edge state and superior imaging performance is ensured.

Second Example

Figure 3:
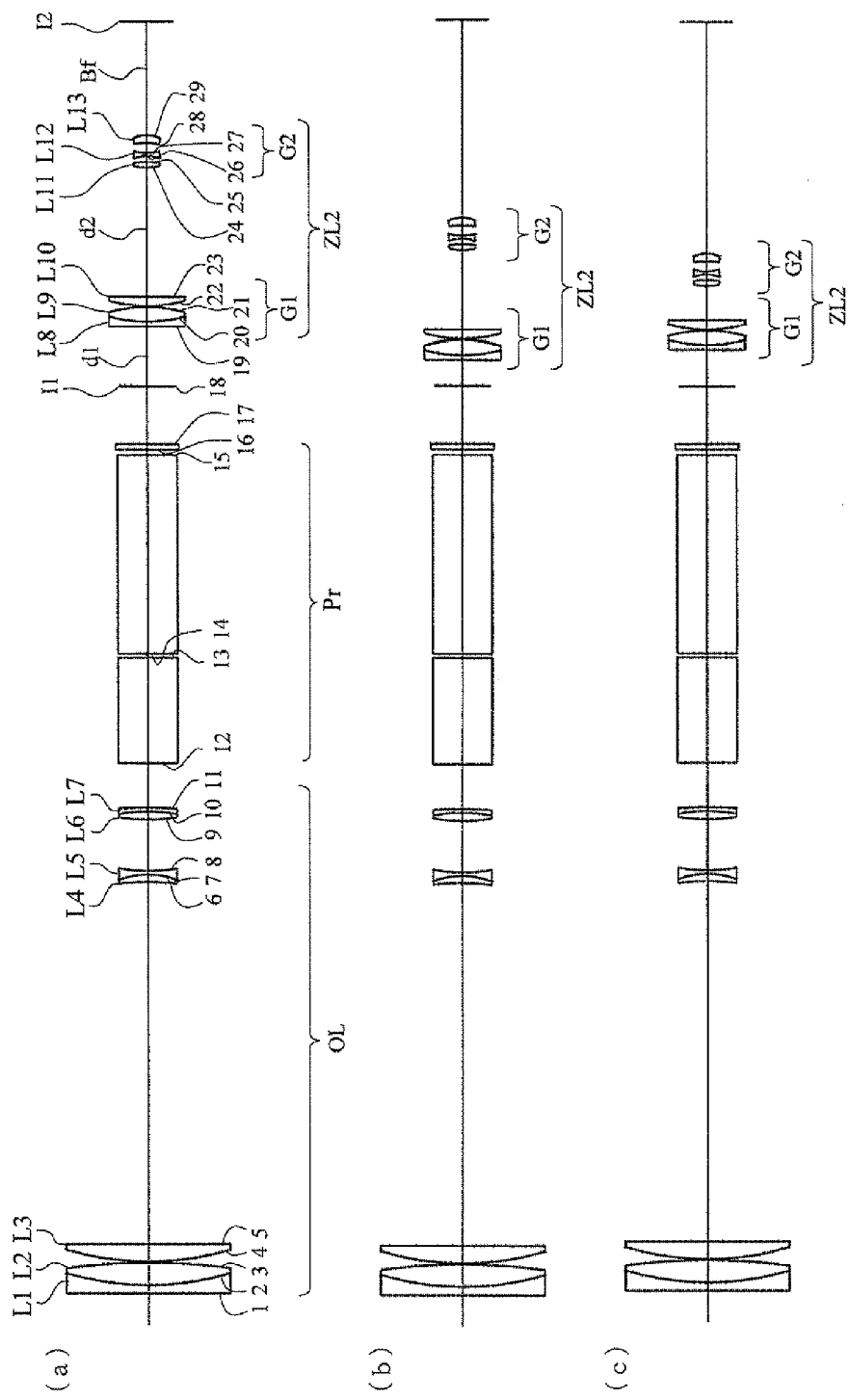
[FIG. 3]

FIG. 3 illustrates a telescope optical system including a relay zoom system ZL2 according to a second example. The relay zoom system ZL2 according to the present second example includes, in order from the object side, a first lens group G1 having a positive refractive power and a second lens group G2 having a positive refractive power. The first lens group G1 is made up of in order from the object side, a cemented lens that cements together a planoconcave lens L8 whose planar surface faces the object side and a biconvex lens L9, and a planoconvex lens L10 whose convex surface faces the object side. In addition, the second lens group G2 comprises, in order from the object side, a biconvex lens L11, a biconcave lens L12, and a positive meniscus lens L13 whose concave surface faces the object side.

Specifications of the relay zoom system ZL2 according to the second example and illustrated in FIG. 3 are presented in Table 3 below.

TABLE 3

[General specifications]

| | Lower magnification edge | Intermediate focal length | Higher magnification edge |
|---|---|---|---|
| f = | 500 | 1000 | 1500 |
| FNo. = | 5.88 | 11.76 | 17.65 |
| f1 = | | 63.0 | |
| f11 = | | 155.0 | |
| f12 = | | 106.7 | |
| f2 = | | 50.0 | |

[Lens data]

| m | r | d | nd | νd |
|---|---|---|---|---|
| 18 | 0.000 | d1 | | |
| 19 | 0.000 | 2.500 | 1.75520 | 27.6 |
| 20 | 76.100 | 8.000 | 1.62041 | 60.1 |
| 21 | −76.100 | 0.500 | | |
| 22 | 76.100 | 5.000 | 1.71300 | 53.9 |
| 23 | 0.000 | d2 | | |
| 24 | 23.700 | 3.200 | 1.71300 | 53.9 |
| 25 | −52.767 | 3.200 | | |
| 26 | −18.140 | 1.600 | 1.64769 | 33.9 |
| 27 | 23.900 | 5.400 | | |
| 28 | −59.500 | 4.300 | 1.71300 | 53.9 |
| 29 | −16.702 | Bf | | |

[Variable surface intervals]

| | Lower magnification edge | Intermediate focal length | Higher magnification edge |
|---|---|---|---|
| f = | 500 | 1000 | 1500 |
| d1 = | 32.564 | 14.098 | 19.874 |
| d2 = | 69.710 | 42.666 | 18.434 |
| Bf = | 61.454 | 106.965 | 125.419 |

[Condition-corresponding values]

(1) f1/f2 = 1.26
(2) f11/f12 = 1.453

Figure 4:
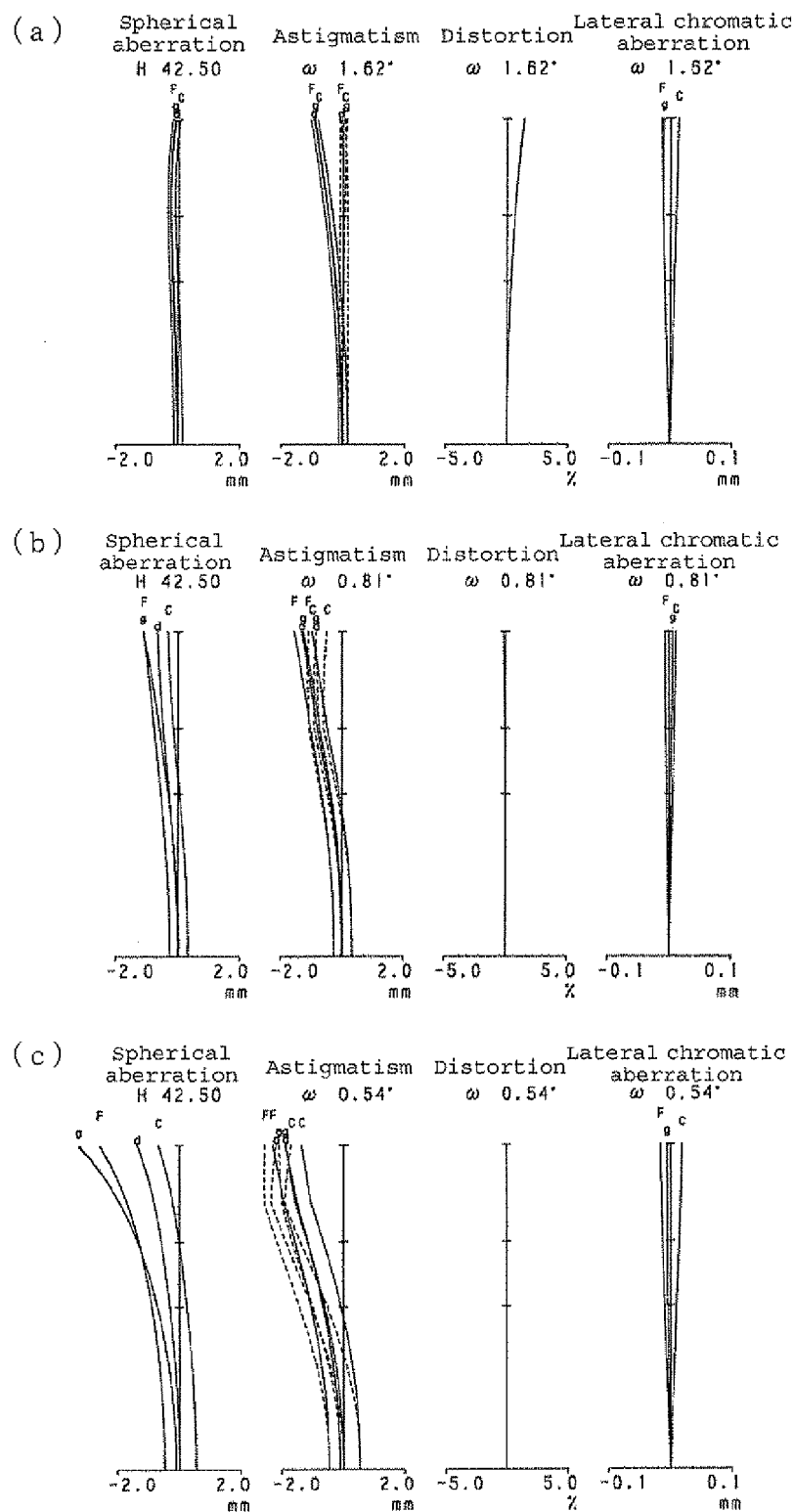
[FIG. 4]

As shown, conditional expressions (1) to (2) given above are both satisfied in the second example. FIG. 4 presents various aberration diagrams of spherical aberration, astigmatism, distortion, and lateral chromatic aberration with respect to rays of the d-line, the C-line, the F-line, and the g-line of the relay zoom system ZL2 according to the present second example in the lower magnification edge state, the intermediate focal length state, and the higher magnification edge state. As is apparent from the various aberration diagrams presented in FIG. 4, with the relay zoom system ZL2 according to the present second example, various aberrations are favorably corrected from the lower magnification edge state to the higher magnification edge state and superior imaging performance is ensured.

Third Example

FIG. 5 illustrates a telescope optical system including a relay zoom system ZL3 according to a third example. The relay zoom system ZL3 according to the present third example includes, in order from the object side, a first lens group G1 having a positive refractive power and a second lens group G2 having a positive refractive power. The first lens group G1 is made up of, in order from the object side, a cemented lens that cements together a biconcave lens L8 and a biconvex lens L9, and a positive meniscus lens L10 whose convex surface faces the object side. Furthermore, the second lens group G2 is made up of, in order from the object side, a biconvex lens L11, a biconcave lens L12, and a cemented lens that cements together a biconcave lens L13 and a biconvex lens L14.

Specifications of the relay zoom system ZL3 according to the third example and illustrated in FIG. 5 are presented in Table 4 below.

TABLE 4

[General specifications]

|  | Lower magnification edge | Intermediate focal length | Higher magnification edge |
|---|---|---|---|
| f = | 500 | 1000 | 1500 |
| FNo. = | 5.88 | 11.76 | 17.65 |
| f1 = | | 56.7 | |
| f11 = | | 138.8 | |
| f12 = | | 98.0 | |
| f2 = | | 45.0 | |

[Lens data]

| m | r | d | nd | νd |
|---|---|---|---|---|
| 18 | 0.000 | d1 | | |
| 19 | −365.288 | 2.500 | 1.71736 | 29.5 |
| 20 | 59.000 | 8.800 | 1.62230 | 53.1 |
| 21 | −59.000 | 0.500 | | |
| 22 | 59.000 | 5.000 | 1.71300 | 53.9 |
| 23 | 365.288 | d2 | | |
| 24 | 18.600 | 3.000 | 1.71300 | 53.9 |
| 25 | −39.000 | 2.600 | | |
| 26 | −15.300 | 1.500 | 1.64769 | 33.9 |
| 27 | 15.300 | 5.000 | | |
| 28 | −33.600 | 1.500 | 1.61772 | 49.8 |
| 29 | 33.600 | 3.600 | 1.71300 | 53.9 |
| 30 | −14.020 | Bf | | |

[Variable surface intervals]

|  | Lower magnification edge | Intermediate focal length | Higher magnification edge |
|---|---|---|---|
| f = | 500 | 1000 | 1500 |
| d1 = | 27.832 | 11.193 | 16.388 |
| d2 = | 60.330 | 35.995 | 14.185 |
| Bf = | 56.067 | 97.042 | 113.658 |

[Condition-corresponding values]

(1) f1/f2 = 1.26
(2) f11/f12 = 1.416

Figure 6:
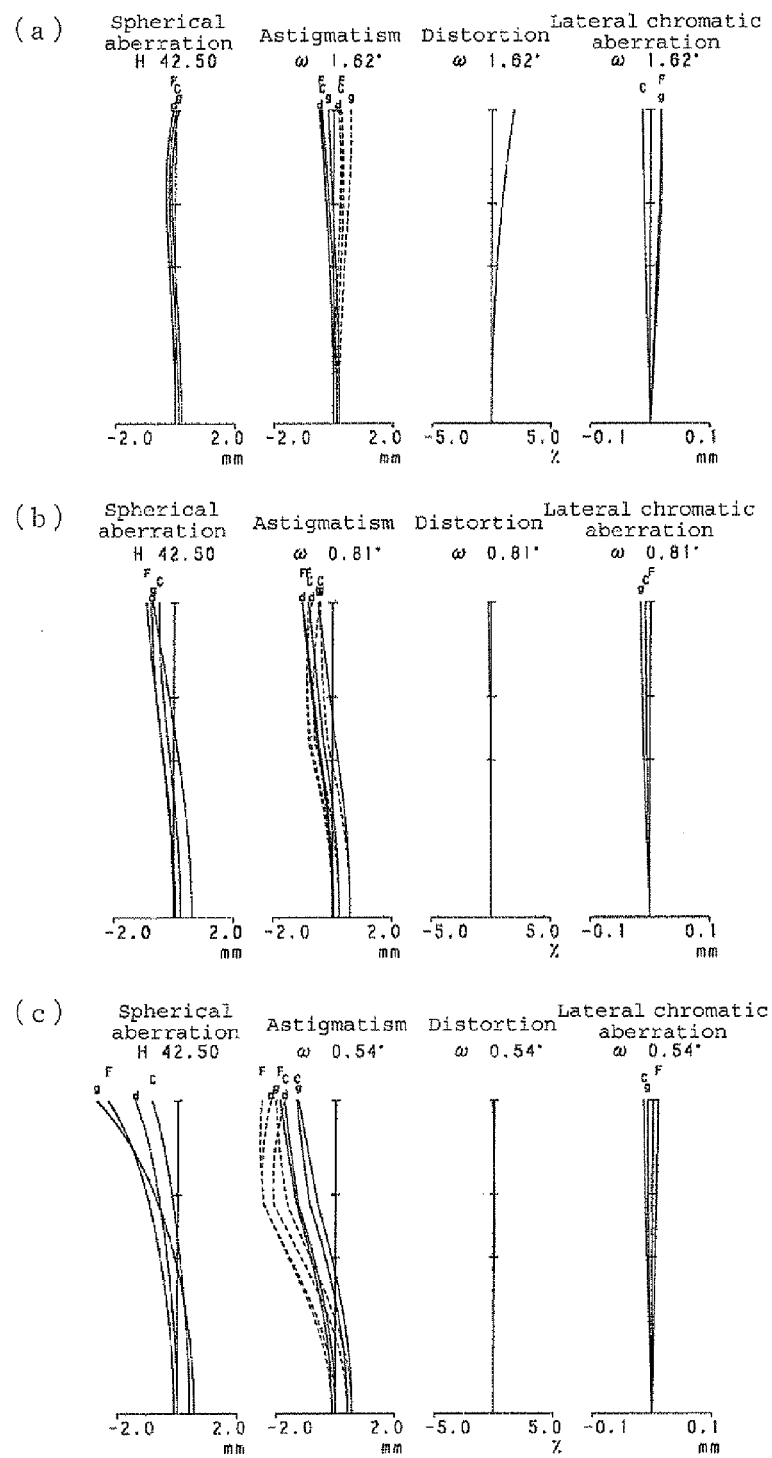
[FIG. 6]

As shown, conditional expressions (1) to (2) given above are both satisfied in the third example. FIG. 6 presents various aberration diagrams of spherical aberration, astigmatism, distortion, and lateral chromatic aberration with respect to rays of the d-line, the C-line, the F-line, and the g-line of the relay zoom system ZL3 according to the present third example in the lower magnification edge state, the intermediate focal length state, and the higher magnification edge state. As is apparent from the various aberration diagrams presented in FIG. 6, with the relay zoom system ZL3 according to the present third example, various aberrations are favorably corrected from the lower magnification edge state to the higher magnification edge state and superior imaging performance is ensured.

Fourth Example

Figure 7:
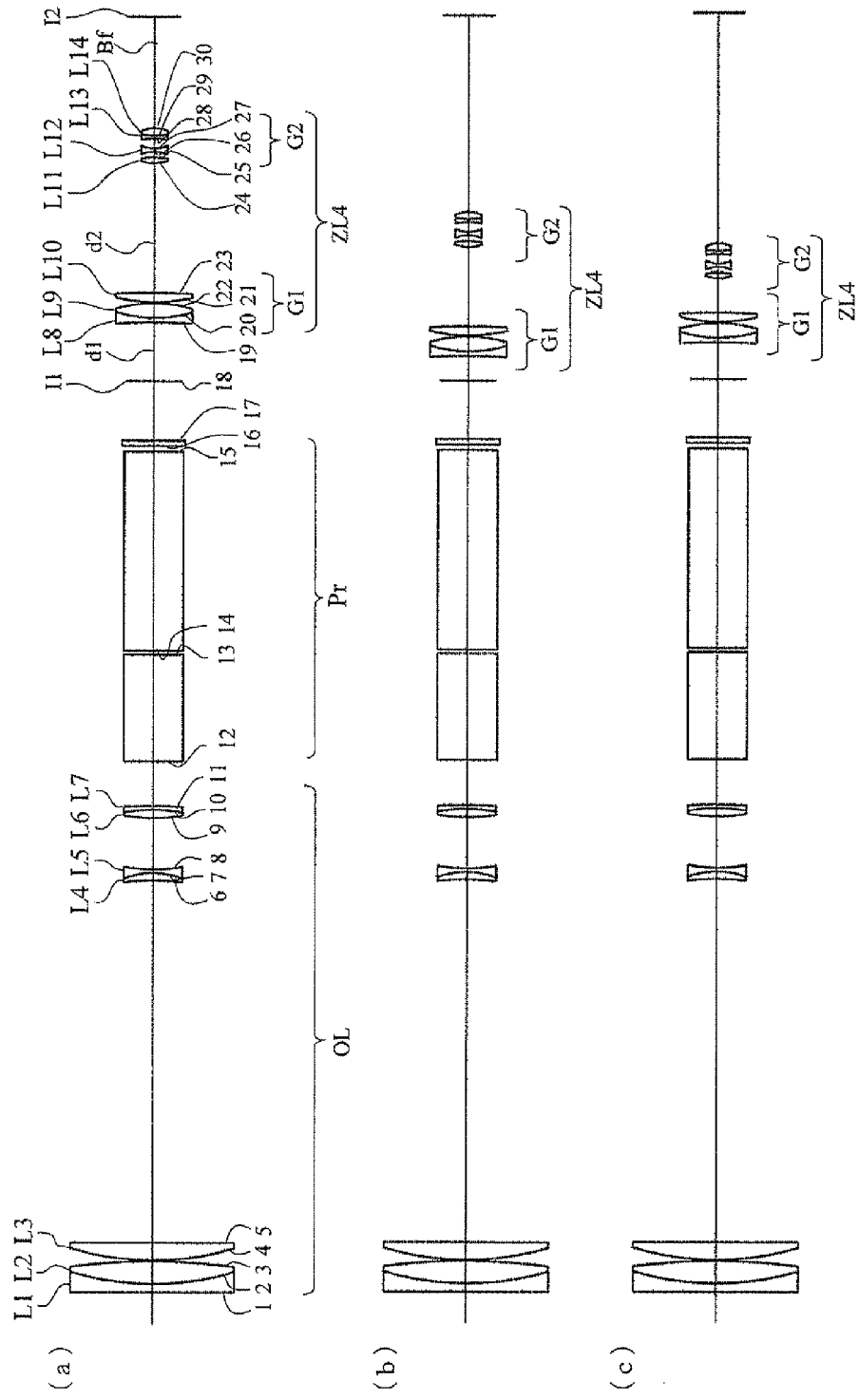
[FIG. 7]

FIG. 7 illustrates a telescope optical system including a relay zoom system ZL4 according to a fourth example. The relay zoom system ZL4 according to the present fourth example includes, in order from the object side, a first lens group G1 having a positive refractive power and a second lens group G2 having a positive refractive power. The first lens group G1 is made up of, in order from the object side, a cemented lens that cements together a biconcave lens L8 and a biconvex lens L9, and a biconvex lens L10. Furthermore, the second lens group G2 is made up of, in order from the object side, a biconvex lens L11, a biconcave lens L12, and a cemented lens that cements together a biconcave lens L13 and a biconvex lens L14.

Specifications of the relay zoom system ZL4 according to the fourth example and illustrated in FIG. 7 are presented in Table 5 below.

TABLE 5

[General specifications]

|  | Lower magnification edge | Intermediate focal length | Higher magnification edge |
|---|---|---|---|
| f = | 500 | 1000 | 1500 |
| FNo. = | 5.88 | 11.76 | 17.65 |
| f1 = | | 63.0 | |
| f11 = | | 174.4 | |
| f12 = | | 99.9 | |
| f2 = | | 50.0 | |

[Lens data]

| m | r | d | nd | νd |
|---|---|---|---|---|
| 18 | 0.000 | d1 | | |
| 19 | −400.000 | 2.500 | 1.71736 | 29.5 |
| 20 | 71.000 | 8.000 | 1.62041 | 60.1 |
| 21 | −71.000 | 0.500 | | |
| 22 | 86.166 | 5.000 | 1.71300 | 53.9 |
| 23 | −400.000 | d2 | | |
| 24 | 20.120 | 3.200 | 1.71300 | 53.9 |
| 25 | −42.730 | 3.200 | | |
| 26 | −16.780 | 1.600 | 1.64769 | 33.9 |
| 27 | 17.200 | 5.400 | | |
| 28 | −36.000 | 1.500 | 1.61772 | 49.8 |
| 29 | 40.000 | 4.000 | 1.71300 | 53.9 |
| 30 | −15.716 | Bf | | |

[Variable surface intervals]

|  | Lower magnification edge | Intermediate focal length | Higher magnification edge |
|---|---|---|---|
| f = | 500 | 1000 | 1500 |
| d1 = | 31.674 | 13.208 | 18.984 |
| d2 = | 69.650 | 42.605 | 18.372 |
| Bf = | 60.083 | 105.593 | 124.049 |

[Condition-corresponding values]

(1) f1/f2 = 1.26
(2) f11/f12 = 1.746

Figure 8:
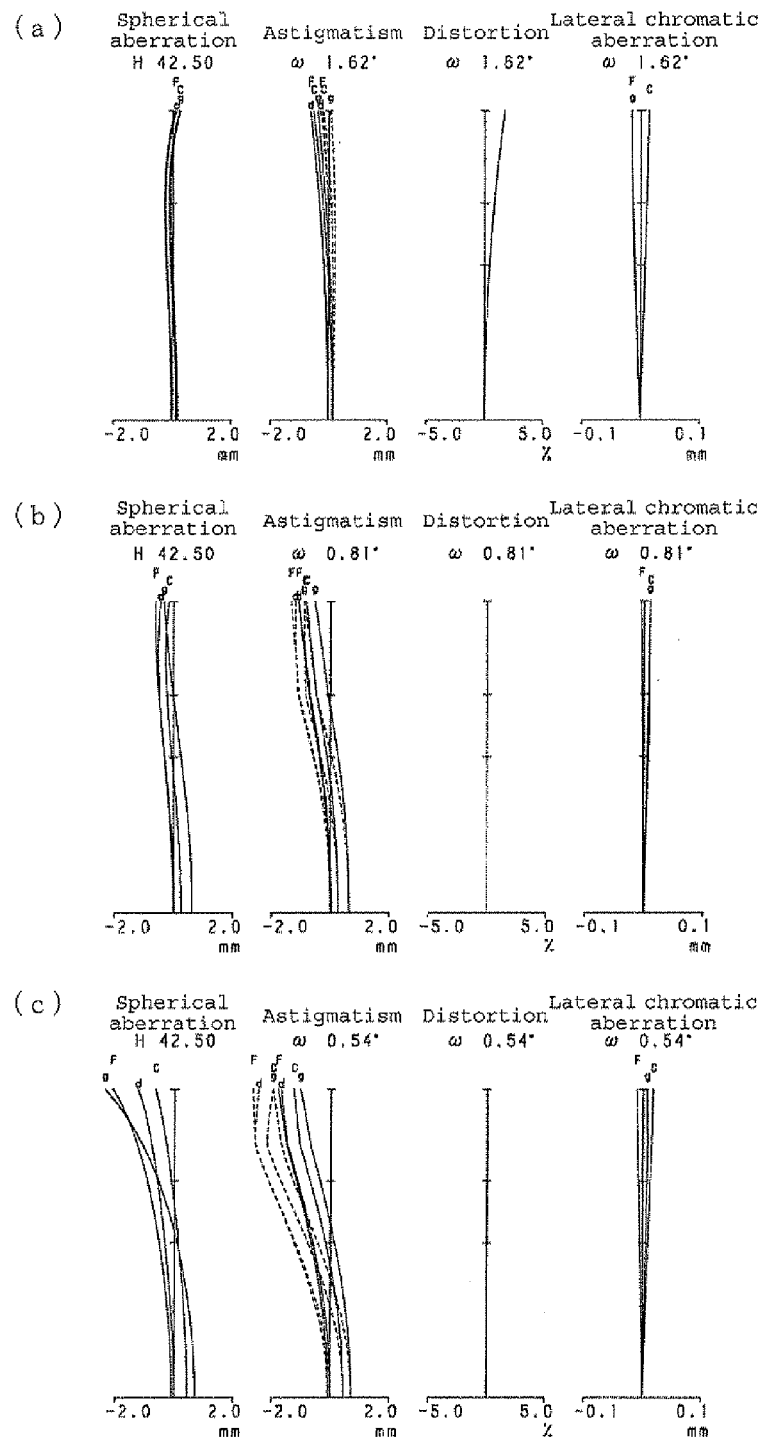
[FIG. 8]

As shown, conditional expressions (1) to (2) given above are both satisfied in the fourth example. FIG. 8 presents various aberration diagrams of spherical aberration, astigmatism, distortion, and lateral chromatic aberration with respect to rays of the d-line, the C-line, the F-line, and the g—line of the relay zoom system ZL4 according to the present fourth example in the lower magnification edge state, the intermediate focal length state, and the higher magnification edge state. As is apparent from the various aberration diagrams presented in FIG. 8, with the relay zoom system ZL4 according to the present fourth example, various aberrations are favorably corrected from the lower magnification edge state to the higher magnification edge state and superior imaging performance is ensured.

Fifth Example

Figure 9:
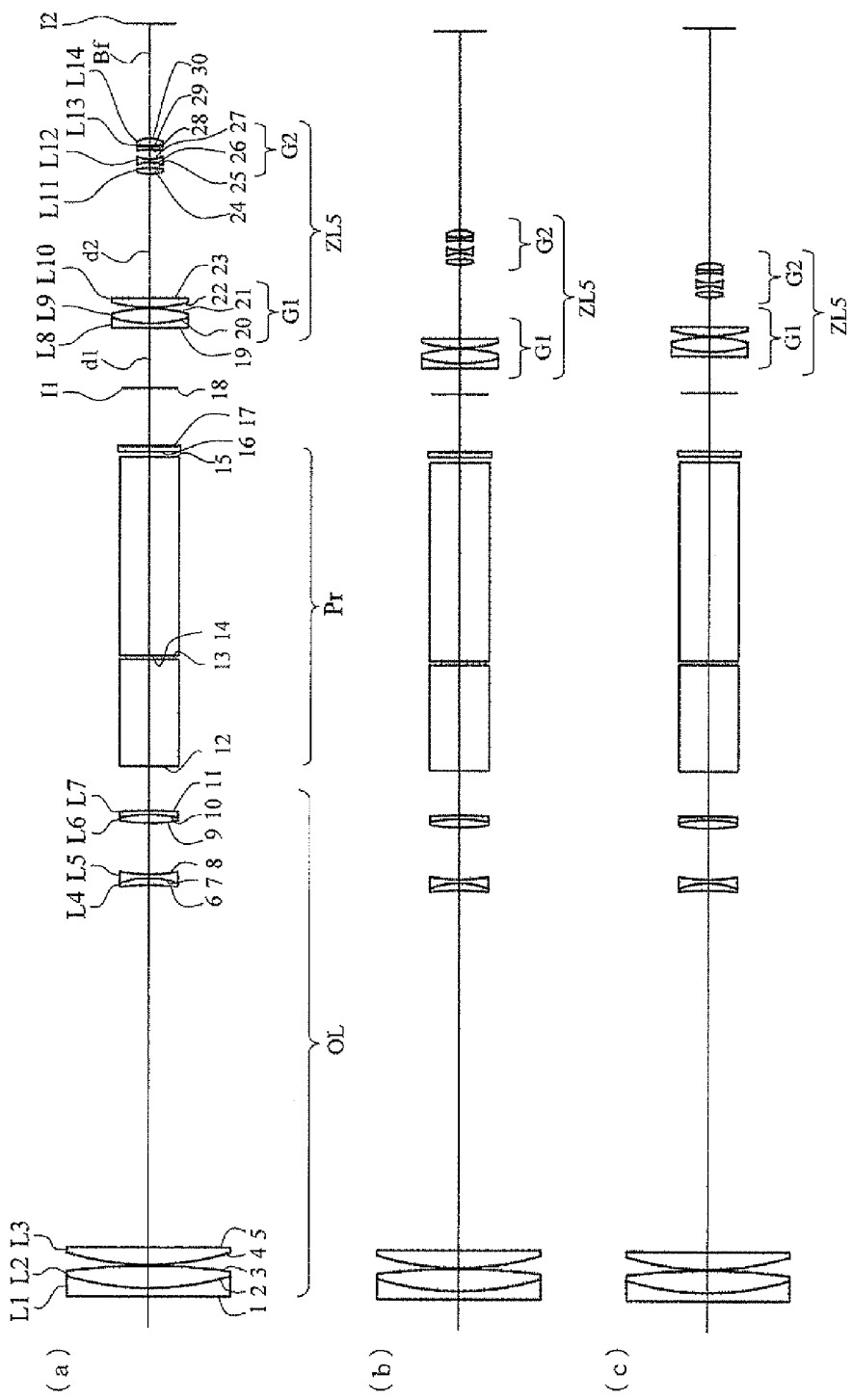
[FIG. 9]

FIG. 9 illustrates a telescope optical system including a relay zoom system ZL5 according to a fifth example. The relay zoom system ZL5 according to the present fifth example includes, in order from the object side, a first lens group G1 having a positive refractive power and a second lens group G2 having a positive refractive power. The first lens group G1 is made up of, in order from the object side, a cemented lens that cements together a planoconcave lens L8 whose planar surface faces the object side and a biconvex lens L9, and a planoconvex lens L10 whose convex surface faces the object side. Furthermore, the second lens group G2 is made up of, in order from the object side, a biconvex lens L11, a biconcave lens L12, and a cemented lens that cements together a biconcave lens L13 and a biconvex lens L14.

Specifications of the relay zoom system Z145 according to the fifth example and illustrated in FIG. 9 are presented in Table 6 below.

TABLE 6

[General specifications]

| | Lower magnification edge | Intermediate focal length | Higher magnification edge |
|---|---|---|---|
| f = | 500 | 1000 | 1500 |
| FNo. = | 5.88 | 11.76 | 17.65 |
| f1 = | | 63.0 | |
| f11 = | | 155.0 | |
| f12 = | | 106.7 | |
| f2 = | | 50.0 | |

[Lens data]

| m | r | d | nd | vd |
|---|---|---|---|---|
| 18 | 0.000 | d1 | | |
| 19 | 0.000 | 2.500 | 1.75520 | 27.6 |
| 20 | 76.100 | 8.000 | 1.62041 | 60.1 |
| 21 | −76.100 | 0.500 | | |
| 22 | 76.100 | 5.000 | 1.71300 | 53,9 |
| 23 | 0.000 | d2 | | |
| 24 | 20.690 | 3.200 | 1.71300 | 53.9 |
| 25 | −45.072 | 3.200 | | |
| 26 | −16.370 | 1.600 | 1.64769 | 33.9 |
| 27 | 17.160 | 5.400 | | |
| 28 | −36.450 | 1.500 | 1.61772 | 49.8 |
| 29 | 40.000 | 4.000 | 1.71300 | 53.9 |
| 30 | −15.080 | Bf | | |

[Variable surface intervals]

| | Lower magnification edge | Intermediate focal length | Higher magnification edge |
|---|---|---|---|
| f = | 500 | 1000 | 1500 |
| d1 = | 32.564 | 14.098 | 19.874 |
| d2 = | 67.013 | 39.973 | 15.741 |
| Bf = | 62.039 | 107.548 | 126.001 |

[Condition-corresponding values]

(1) f1/f2 = 1.26
(2) f11/f12 = 1.453

Figure 10:
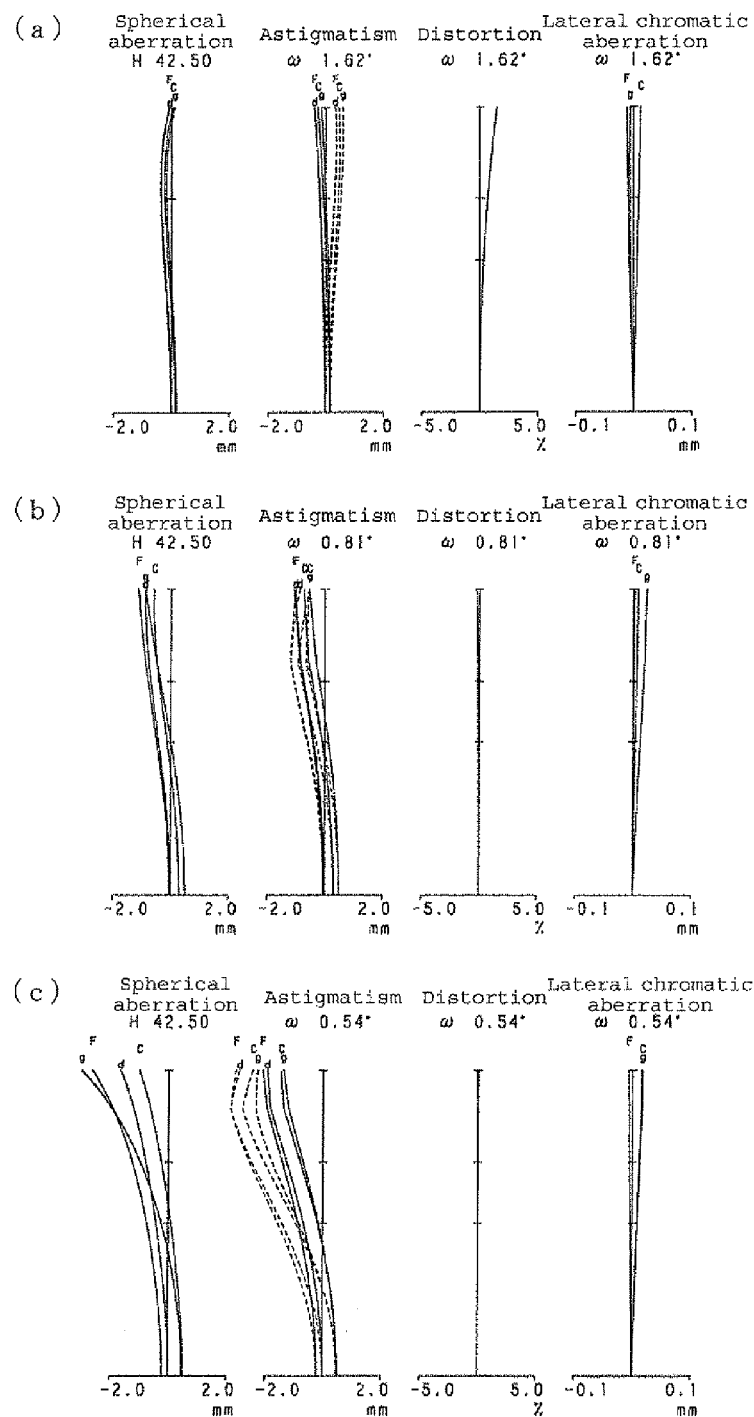
[FIG. 10]

As shown, conditional expressions (1) to (2) given above are both satisfied in the fifth example. FIG. 10 presents various aberration diagrams of spherical aberration, astigmatism, distortion, and lateral chromatic aberration with respect to rays of the d-line, the C—line, the F-line, and the g-line of the relay zoom system ZL5 according to the present fifth example in the lower magnification edge state, the intermediate focal length state, and the higher magnification edge state. As is apparent from the various aberration diagrams presented in FIG. 10, with the relay zoom system ZL5 according to the present fifth example, various aberrations are favorably corrected from the lower magnification edge state to the higher magnification edge state and superior imaging performance is ensured.

[Reference Signs List]

| ZL (ZL1 to ZL5) | relay zoom system |
|---|---|
| G1 | first lens group |
| G2 | second lens group |

The invention claimed is:

1. A relay zoom system comprising, in order from an object side:
   a first lens group having a positive refractive power; and
   a second lens group having a positive refractive power, wherein
   the first lens group and the second lens group are each made up of at least two positive lenses and one negative lens,
   the first lens group and the second lens group move along an optical axis when magnification is varied from a lower magnification edge state to a higher magnification edge state,
   the first lens group includes:
      a cemented lens which cements together one of the positive lenses and the negative lens, and
      a single positive lens, and
   if f11 denotes a focal length of the cemented lens and f12 denotes a focal length of the single positive lens, then the relay zoom system satisfies a condition expressed by an expression below:

$$1 < f11/f12 < 2.$$

2. The relay zoom system according to claim 1, wherein
   if f1 denotes a focal length of the first lens group and f2 denotes a focal length of the second lens group, then the relay zoom system satisfies a condition expressed by an expression below:

$$1 < f1/f2 < 1.5.$$

3. The relay zoom system according to claim 1, wherein the lenses of the second lens group are arranged in an order of positive, negative, positive.

4. The relay zoom system according to claim 1, wherein the second lens group further includes at least one negative lens, and the negative lens is cemented together with at least one of the two positive lenses included in the second lens group.

5. The relay zoom system according to claim 1, wherein the relay zoom system has a magnification ratio of 2 or higher.

6. The relay zoom system according to claim 1, wherein when magnification is varied from a lower magnification edge state to a higher magnification edge state,
   the first lens group moves towards either an object side or an image side from the lower magnification edge state to a predetermined focal length state and moves in the opposite direction from the predetermined focal length state to the higher magnification edge state.

7. The relay zoom system according to claim 1, wherein the relay zoom system relays a primary image by an objective lens to form a secondary image.

8. A relay zoom system comprising, in order from an object side:
- a first lens group having a positive refractive power; and
- a second lens group having a positive refractive power, wherein
- the first lens group and the second lens group are each made up of at least two positive lenses and one negative lens,
- the first lens group and the second lens group move along an optical axis when magnification is varied from a lower magnification edge state to a higher magnification edge state, and
- the first lens group moves towards either an object side or an image side from the lower magnification edge state to a predetermined focal length state and moves in the opposite direction from the predetermined focal length state to the higher magnification edge state.

9. The relay zoom system according to claim 8, wherein if $f1$ denotes a focal length of the first lens group and $f2$ denotes a focal length of the second lens group, then the relay zoom system satisfies a condition expressed by an expression below:

$$1 < f1/f2 < 1.5.$$

10. The relay zoom according to claim 8, wherein the relay zoom system has a magnification ratio of 2 or higher.

11. The relay zoom system according to claim 8, wherein the relay zoom system relays a primary image by an objective lens to form a secondary image.

* * * * *